US006421435B1

(12) United States Patent
Bastien et al.

(10) Patent No.: US 6,421,435 B1
(45) Date of Patent: Jul. 16, 2002

(54) SS7 NETWORK PLANNING TOOL

(75) Inventors: Pierre L. Bastien, Castle Rock; Stephen L. Bulick, Boudler; Xiaojiang Lu, Broomfield; Victoria L. C. Okeson, Arvada; Steve E. Showell, Parker, all of CO (US)

(73) Assignee: Qwest Communications International Inc., Denver, CO (US)

( * ) Notice: Subject to any disclaimer, the term of this patent is extended or adjusted under 35 U.S.C. 154(b) by 0 days.

(21) Appl. No.: 09/201,264

(22) Filed: Nov. 30, 1998

(51) Int. Cl.[7] .......................... H04M 15/00; H04M 7/00
(52) U.S. Cl. ............. 379/133; 379/112.05; 379/221.07; 379/221.08; 370/230; 370/252
(58) Field of Search ........................ 379/112.01, 112.04, 379/112.05, 112.06, 133, 138, 221.08, 221.07, 269; 370/230, 235, 252, 255

(56) References Cited

U.S. PATENT DOCUMENTS

| | | | |
|---|---|---|---|
| 4,979,118 A | * 12/1990 | Kheradpir | 364/436 |
| 4,991,204 A | * 2/1991 | Yamamoto et al. | 379/221 |
| 5,042,064 A | * 8/1991 | Chung et al. | 379/113 |
| 5,142,570 A | * 8/1992 | Chaudhary et al. | 379/221 |
| 5,270,919 A | * 12/1993 | Blake et al. | 364/401 |
| 5,359,649 A | * 10/1994 | Rosu et al. | 379/221 |
| 5,425,086 A | * 6/1995 | Hidake et al. | 379/113 |
| 5,513,257 A | * 4/1996 | Yoo et al. | 379/220 |
| 5,539,815 A | * 7/1996 | Samba | 379/220 |
| 5,559,877 A | * 9/1996 | Ash et al. | 379/221 |
| 5,574,770 A | * 11/1996 | Yoo et al. | 379/34 |
| 5,825,769 A | * 10/1998 | O'Reillly et al. | 370/360 |
| 5,828,729 A | * 10/1998 | Clermont et al. | 379/34 |
| 5,937,042 A | * 8/1999 | Sofman | 379/113 |

\* cited by examiner

Primary Examiner—Binh Tieu
(74) Attorney, Agent, or Firm—Brooks & Kushman P.C.

(57) ABSTRACT

Planning alternative SS7 networks is a complex task requiring assistance from an intelligent planning tool. The tool provides a method for forecasting service loads including automatically obtaining network traffic information from the network. Service loads are estimated based on a first set of network traffic information and service descriptions. Correction factors are calculated for service loads based on a second set of network traffic information. The correction factors are applied to estimated service loads to determine peak loads for each STP in the core network based on network traffic, component locations, and component connectivity.

13 Claims, 5 Drawing Sheets

SS7 NETWORK PLANNING TOOL

TECHNICAL FIELD

The present invention relates to tools for planning Signaling System 7 (SS7) communication networks.

BACKGROUND ART

An SS7 network is a packet data network used for out-of-band signaling to perform call set-up and tear-down, to implement Intelligent Network (IN) and Advanced Intelligent Network (AIN) services, to route traffic to interexchange carriers (IXCs), and to access database information needed to provide certain services such as 800, LNP, and LIDB. Core components of the SS7 network include switches called Signal Transfer Points (STPs). The STPs are interconnected with data links to form a core network.

Connected to each STP may be several different network elements. Signal Switching Points (SSPs or central offices) route calls. Points-of-Presence (POPs) serve as sources and sinks for network traffic. POPs provide alternate local carriers and IXCs with access to the Local Access and Transport Area (LATA) serviced by the STP. Network databases (DBs) support customer services such as IN and AIN.

Designing an alternative network includes adding, deleting, and moving network components, changing component capabilities, adding and modifying network services, and modifying connectivity between components. Changes to an existing network can create unintended situations. Removing an STP can leave elements disconnected from the network. Removing a database can eliminate a required service. Modifying connectivity can create load in excess of capacity on certain links and core network components. Designs are further complicated by changing loads and service requirements over time.

Traditionally, SS7 network planning has been accomplished through the use of spreadsheets. These spreadsheets only model a portion of the network such as, for example, the core network. Another difficulty is that load information has to be manually entered. Further, graphical display of the network and the effects of modifying the network are limited. As network size and complexity increases, the number of variables used to model the network is increasing beyond the capacity of the spreadsheet. Finally, a user attempting to create an alternative network does not have sufficient guidance and correctness validation.

What is needed is a system and method for modeling an SS7 network that provides greater capabilities. The tool should estimate STP service loads including demands generated by SSPs, POPs, and IN and AIN databases based on network traffic information. Estimated loads should be checked for accuracy based on additional network traffic information. For each study period in the SS7 network plan, service loads should be modified to reflect network growth.

SUMMARY OF THE INVENTION

It is a primary object of the present invention to provide an SS7 network modeling tool with greater capabilities than existing tools.

Another object of the present invention is to provide an SS7 network planning tool capable of estimating STP service loads including demands generated by SSPs, POPs, and IN and AIN databases based on network traffic information.

Still another object of the present invention is to check estimated service loads with network traffic information not used to estimate the service loads.

A further object of the present invention is to modify service loads for each study period in the SS7 network plan to reflect network growth.

In carrying out the above objects and other objects and features of the present invention, a method is provided for planning an SS7 network. The method includes automatically obtaining network traffic information from the network. Service loads are estimated based on a first set of network traffic information and service descriptions. Correction factors are calculated for service loads based on a second set of network traffic information. The correction factors are applied to estimated service loads to determine peak loads for each STP in the core network based on network traffic, component locations, and component connectivity.

In one embodiment, estimating service loads includes calculating a fractional size of each SSP homing on a given STP from the first set of network traffic information for each peak hour. LSTP local POTS loads for each peak hour are calculated. IN and AIN loads for each LSTP and each peak hour are calculated. POP loads for each LSTP and for each peak hour are also calculated. Growth is applied to service loads for each study period.

In another embodiment. calculating correction factors includes determining RSTP-LSTP correction factors for each RSTP-to-LSTP link by peak hour as the ratio of octets observed on the RSTP-to-LSTP link over a first time period to the estimated octets on the RSTP-to-LSTP link over the first time period. The estimated octets for each RSTP-to-LSTP link are based on the calculated LSTP loads. An RSTP message correction factor is determined by peak hour as the ratio of messages observed at the RSTP over a second time period to the estimated messages at the RSTP over the second time period. The estimated messages at the RSTP are based on calculated LSTP loads. POTS message correction factors are determined for each LSTP by peak hour as the ratio of POTS messages observed at the LSTP to the estimated POTS messages at the LSTP. POTS messages observed at each LSTP are based on a number of messages observed at the LSTP less a number of messages observed between the LSTP and connecting RSTP.

In a further embodiment, the first set of network traffic information includes traffic rates between each RSTP-LSTP pair, traffic rates between each POP-STP pair, and traffic rates into each STP.

Another method is provided for planning an SS7 network. Network traffic information is obtained from the network. Service loads are estimated based on a first set of network traffic information and service descriptions. Correction factors are calculated for service loads based on a second set of network traffic information. Correction factors are applied to estimated service loads to determine current peak loads for each STP in the core network. Peak loads are forecasted for each STP during each study period based on the current peak loads for each STP. Equipment capacity exhaustion is determined for each STP, network DB, and core network link during each study period for the network based on the forecasted peak loads. Costs for the network are determined for each study period.

A system for planning an SS7 network is also provided. The system includes at least one planning database having information on network traffic, network component locations, and network component connectivity. The system also includes a load module for estimating service loads based on a first set of network traffic information and on service descriptions, for calculating correction factors for service loads based on a second set of network traffic information, for applying correction factors to estimated service loads to determine peak loads for each STP in the core network, and for storing the determined peak loads in one of the at least one planning database. The system further includes a forecast module for determining equipment capacity exhaustion for each STP, network DB, and core network link during each study period and to determine network costs based on determined peak loads.

The above objects and other objects, features, and advantages of the present invention are readily apparent from the following detailed description of the best modes for carrying out the invention when taken in connection with the accompanying drawings.

BEST MODES FOR CARRYING OUT THE INVENTION

Figure 1:
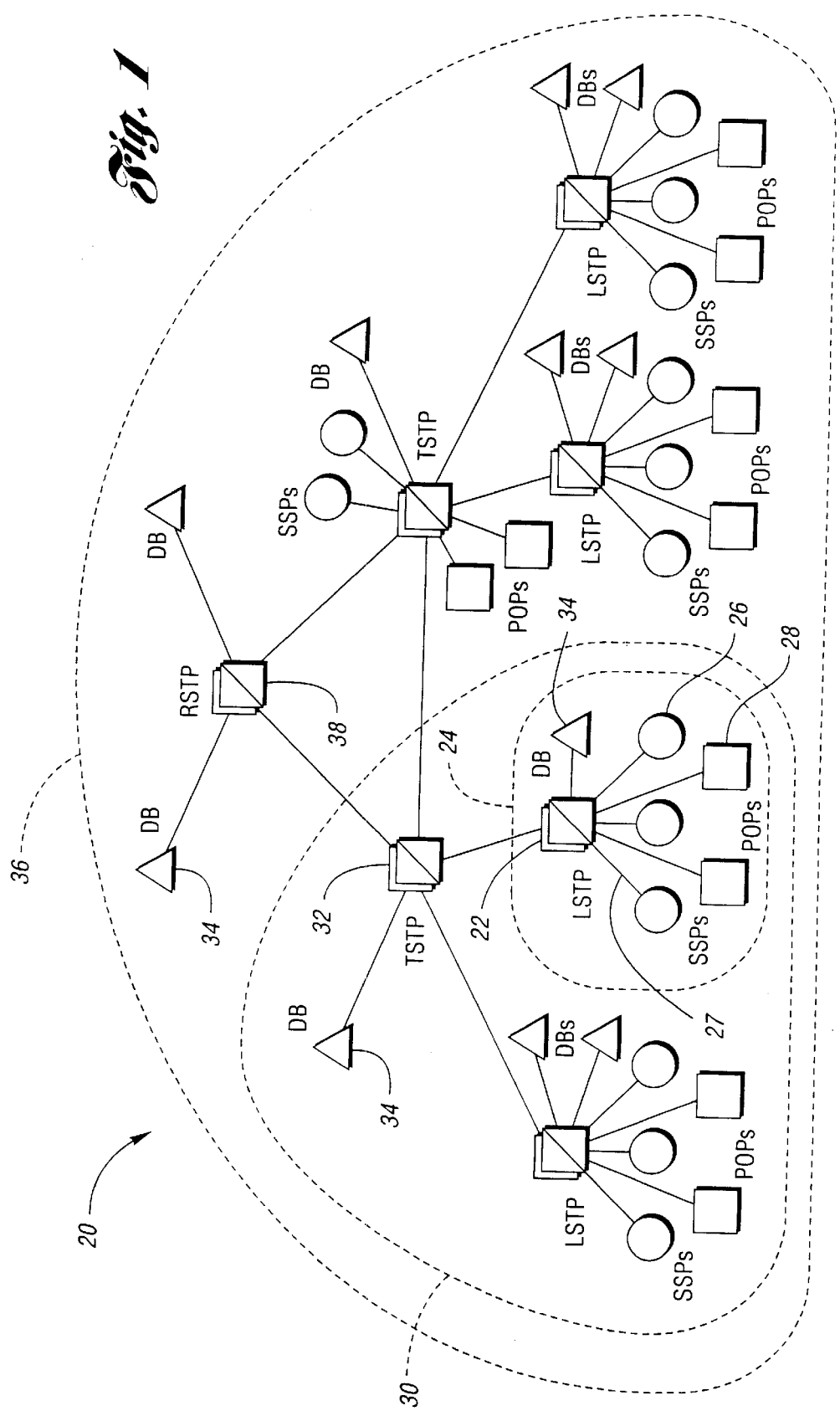
FIG. 1 is a block diagram of an SS7 network architecture that may be planned by the present invention.

Referring now to FIG. 1, an SS7 network architecture is shown. An SS7 network, shown generally by 20, is comprised of STPs interconnected by links to form a core network. Several different switch models may be used as STPs. Each model has different capacity and engineering parameters. Network shown in FIG. 1 has STPs arranged in three tiers, but the present invention applies to any SS7 network configuration.

Local STP (LSTP) 22 serves a LATA, shown generally by 24. Every SSP 26 in LATA 24 is connected either directly or indirectly to LSTP 22. Connections between SSPs 26 and STPs 22, 32 are known as A-links 27.

Each LSTP 22 handles inter-LATA traffic to and from the IXCs via POPs, one of which is indicated by 28, attached to each LSTP 22. POPs 28 provide long distance services to regional Bell operating companies (RBOCs), which would otherwise be prohibited from transporting calls across the boundaries of LATA 24. POP services include AT&T®, MCI®, Sprint®, local exchange carriers, and the like. Each SSP 26 is required to have access to each POP service.

Each LSTP may also service one or more network DBs, one of which is shown as 34. Generally, network DBs are either Service Control Points (SCPs) providing IN services or Intelligent SCPs (ISCPs) providing AIN services. Network DB services include Local Number Portability (LNP), 800 number translation, Line Information Data Base (LIDB), and the like. Each SSP 26 may be required to have access to a particular network DB 34.

Each LATA 24 belongs to a region, one of which is indicated by 30. For the three-tiered network shown in FIG. 1, each LATA 24 within region 30 may be connected to one or more territorial STP (TSTP) 32. TSTP 32 may also service SSPs 26 and POPs 28 directly homed to TSTP 32. Each TSTP 32 in region 36 is connected to regional STP (RSTP) 38. For the purposes of the present invention, TSTP 32 will be treated in the same manner as LSTP 22.

Figure 2:
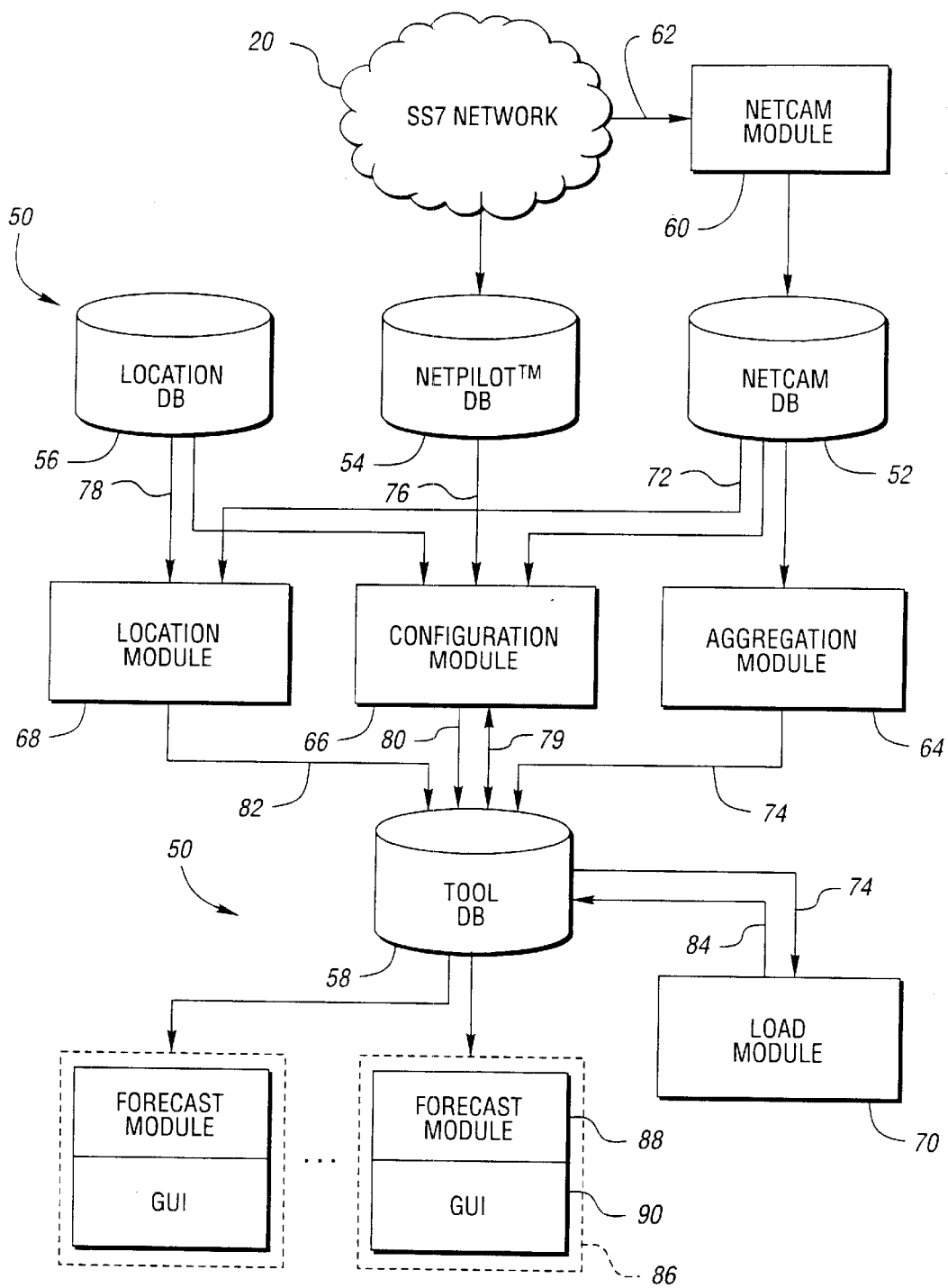
FIG. 2 is a block diagram of an exemplary system according to the present invention.

Referring now to FIG. 2, a block diagram of an exemplary system according to the present invention is shown. An alternative to network 20 is planned to be operated over a sequence of study periods. The configuration and loading of the alternative network is based on current conditions for network 20. Current conditions for network 20 are stored in a planning database, shown generally by 50. In the embodiment shown, planning database 50 is implemented as NETCAM database 52, NetPilot™ database 54, location database 56, and tool database 58. In a preferred embodiment, planning database 50 is implemented using at least one relational database, such as ORACLE from Oracle Corporation.

NETCAM database 52 includes traffic numbers, traffic averages, and outages for network 20. This data is collected in near real-time from network 20 by NETCAM module 60. NETCAM is a program originally developed by U S West, Inc. and Ericsson, Ltd. NETCAM pull 62 is a set of data describing network 20 over a period. such as a half hour. NETCAM module 60 periodically accesses network 20 to obtain NETCAM pull 62 and stores the data in NETCAM database 52. Specific data may include total message signaling units (MSUs) for each STP, global title translation (GTT) counts by translation type of each STP 22, octet loads on core network links, octet loads on SSP A-links 27, and octet loads on POP links.

NetPilot™ database 54 includes information on network component connectivity. NetPilot™ from Bell Communication Research is a program to manage signaling system resources. The data in NetPilot™ database 54 describes the core network connectivity between STPs 22 and network elements connected to each STP 22. The data in NetPilot™ database 54 may be entered manually without using NetPilot™.

Location database 56 includes the location of each component in network 20 together with demographic information. In a preferred embodiment, component geographic location is specified using V and H coordinates as is well known in the telecommunication art. Information includes metropolitan statistical area (MSA) for each SSP 26, LATA codes for each SSP 26, North American Numbering Plan (NANP) data, and NXX (local exchange) data.

Tool database 58 holds data directly accessible by the user as described below. Tool database 58 also holds a location identifier for each combination of state, city, MSA, and LATA in which a component of network 20 appears.

The data in planning database 50 is preprocessed in four modules indicated as aggregation module 64, configuration module 66, location module 68, and load module 70. Aggregation module 64 reads raw NETCAM data 72 from NETCAM database 52 collected over a period of time, typically seven days, and condenses the data. This condensed data is stored as aggregated NETCAM data 74 in tool database 58.

Configuration module 66 accepts raw NETCAM data 72 from NETCAM database 52, raw network element data 76 from NetPilot™ database 54, location data 78 from location database 56, and location identifiers 79 from tool database 58. Configuration module 66 can generate a new location identifier 79 for a component of network 20 located in a combination of state, city, LATA, and MSA not previously required. The new location identifier 79 is stored in tool database 58. Configuration module 66 also develops current network configuration data 80 which is stored in tool database 58.

Location module 68 accepts location data 78 from location database 56 and organizes location data 78 into a usable form, producing formatted location data 82 which is stored in tool database 58.

Load module 70 uses aggregated NETCAM data 74 from tool database 58 to produce peak hours data 84, which is stored back in tool database 58. In order to reduce the complexity of calculations and decrease calculation time, only peak loads for each STP 22 are used in planning calculations. These peak loads occur during the busiest one hour period over a seven day period.

Load module 70 produces peak hours data 84 by examining NETCAM data 74. LSTP local POTS loads are calculated for each LSTP 22 and for each peak hour. IN and AIN loads are calculated for each LSTP 22 and each peak hour. SSP loads are calculated by estimating the size of SSP 26 from A-link loads. POP loads are calculated for each LSTP 22 and for each peak hour. Growth is applied to the service loads for each study period. Details of the operation of load module 70 are described with regards to FIGS. 4 through 7 below.

Many users may utilize the present invention concurrently. Computer system 86 provides an interface between a user and the present invention. As such, computer system 86 includes a display and a keyboard, pointing device, or other data entry and selection tool as is known in the art. In a preferred embodiment. each user has computer system 86 running forecast module 88 and graphical user interface (GUI) 90. Computer system 86 may be a workstation such as, for example, a Sun SPARCSTATION, or a personal computer such as, for example, an Apple MACINTOSH. Alternatively, one or both of forecast module 88 and GUI 90 may run on a central computer and computer system 86 may function as a terminal. The precise hardware used to implement computer system 86 is not critical to the present invention as will be recognized by one of ordinary skill in the art.

FIGS. 3, 4, 5, and 7 show flow diagrams illustrating operation of embodiments of the present invention. As will be appreciated by one of ordinary skill in the art, the operations illustrated are not necessarily sequential operations. Similarly, operations may be performed by software, hardware, or a combination of both. The present invention transcends any particular implementation and aspects are shown in sequential flow chart form for ease of illustration.

Figure 3:
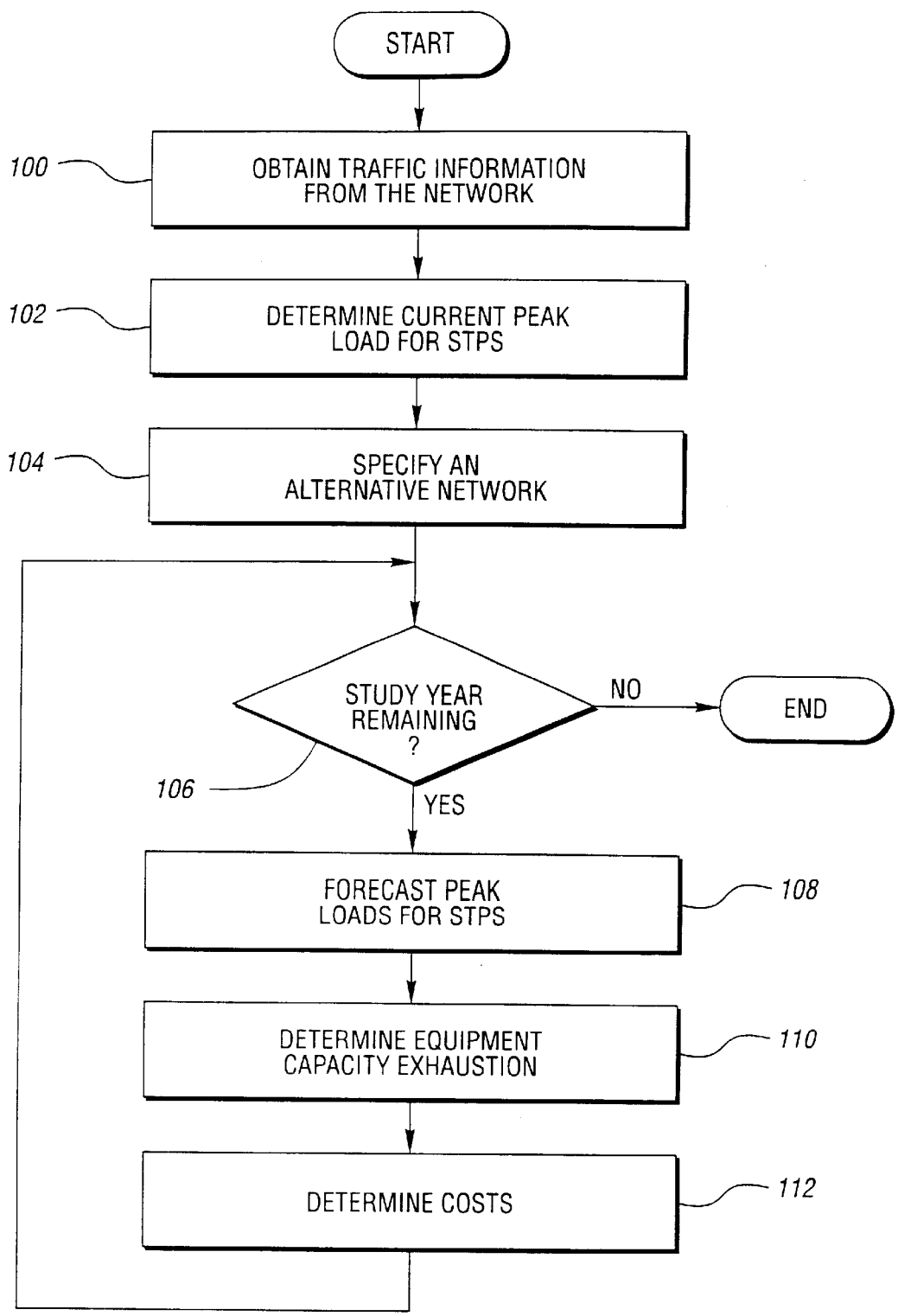
FIG. 3 is a flow diagram of an embodiment of the present invention describing a method for planning an alternative network.

Referring now to FIG. 3, a flow diagram of an embodiment of the present invention is shown. The flow diagram describes a method for planning an SS7 network over a sequence of study periods.

Network traffic information is obtained in block 100. NETCAM module 60 automatically obtains NETCAM pull 62 containing information about network 20 on a periodic basis. The traffic information is aggregated to show loads for each STP 22 for each hour in a seven day period and is stored in planning database 50.

Current peak loads for each STP are determined in block 102. It is possible to perform planning using all of the hourly load information obtained in block 100. However, this would be computationally expensive and does not greatly increase the accuracy of planning calculations. Therefore, the hour producing peak loads and the corresponding load values for each STP 22 are extracted and used in planning calculations.

An alternative network is specified. The goal of planning is to determine the effects that modifying network 20 may have on current and future network performance. The alternative network configuration is created by modifying the design of existing network 20. Due to the complexity of network 20 and the close interaction of network components, great care must be taken when modifying the design of network 20. To assist in creating the alternative network and in interpreting the results of planning simulation, GUI 90 displays graphical representations of the network on a display and allows the user to modify the network by selecting displayed graphical representations of network components. As part of specifying the alternative network, the user may enter the number of study periods desired and may alter the network in for each study period. A check is made to see if any study periods remain in block 106. If not, simulation is complete.

Peak loads for STPs are forecast in block 108. For each study period, the peak loads for each STP 22 are determined based on current STP loads, network connectivity, changes to services provided, and predicted demand for services. For each STP 22, loads expressed in calls per second are calculated by peak hour, by service, by study period, and by base year STP pair. Loads for each SSP 26 are found by calculating a scale factor based on the A-link octet traffic from SSP 26 to corresponding STP 22, then multiplying the base year STP pair load by the scale factor. Loads are determined for services such as plain old telephone service (POTS) local, POTS ATT®, POTS MCI®, POTS Sprint®, CLASS$^{SM}$, 800, LIDB, CND, AIN0.0, AIN0.1, LNP, and the like. Peak load forecasting is further described with regard to FIGS. 4–7 below.

Equipment capacity exhaustion is determined in block 110. The ability of network components to handle peak loads is found. If load exceeds capacity for a component, the user is notified. Maximum equipment required for each network component is also determined.

Cost is determined in block 112. Each component description includes capital costs such as purchase price and salvage value as well as expenses such as installation, removal, annual maintenance, yearly lease costs, costs per mile, and the like. The total cost of the alternative network as well as costs by component type and expense type are determined.

Peak load forecast, equipment capacity exhaustion, and cost determination are repeated until every study period has been completed.

Variations on the above method are possible within the spirit and scope of the present invention as will be recognized by one of ordinary skill in the art. For example, peak loads may be forecasted for every study period prior to determining any equipment capacity exhaustion.

Figure 4:
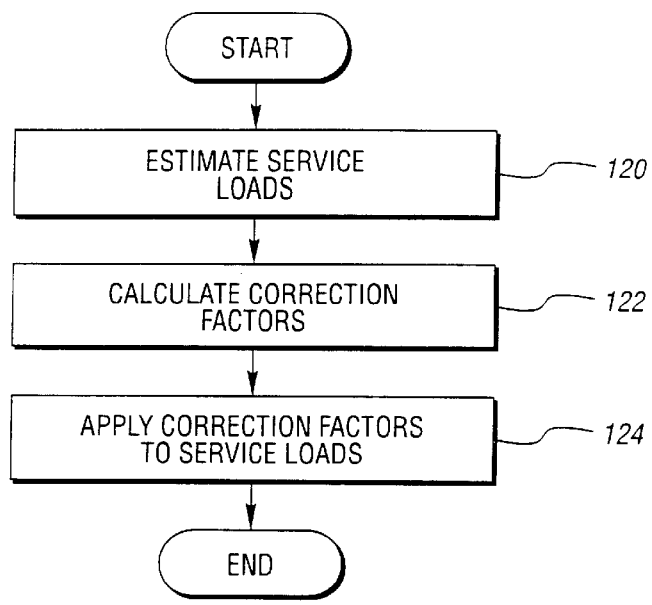
FIG. 4 is a flow diagram of an embodiment of the present invention illustrating forecasting peak loads.

In FIG. 4, a flow diagram of an embodiment of the present invention illustrating forecasting peak loads is shown. Peak load for STPs 22, 38 are a function of the demands from a source to a destination connected by STPs 22, 38. These demands can be expressed by Equation 1:

$$D_{a,b}^{h,s,y} \equiv \{ \beta M_{a,b}^{h,s,y}, \beta M_{b,a}^{h,s,y}, \beta GTT_{a,b}^{h,s,y}, \beta GS_{b,a}^{h,s,y}, \Omega_{a,b}^{h,s,y}, \Omega_{b,a}^{h,s,y} \} \quad (1)$$

where D is the demand between source a and destination b by peak hour h, by service s, and by study year y. For the purposes of the following discussion, each study period will be one year. The first four terms in Equation 1 are message size distributions per second between source a and destination b. The last two terms are the total number of octets per second between a and b.

The regular message size distribution per second, $_\beta M_{a,b}^{h,s,y}$, is the message size distribution per second between source a and destination b excluding Global Title Translations (GTT) and Gateway Screening (GS) messages. STP CPU utilization depends on the size of incoming messages. The bin number, β, is used to describe a distribution of message sizes. The number of bins depends on the type of STP 22, 38 used. For example, the Ericsson AXE® STP has bin limits of 0, 50, 96, 142, 188, 234, and 279. Each bin contains the number of messages per second greater than the bin limit expressed as function O(β). Therefore, the first bin (β=0) contains the total number of messages per second. The message distribution $_\beta M_{a,b}^{h,s,y}$, always has the companion distribution $_\beta M_{b,a}^{h,s,y}$, from destination b to source a. Both regular distributions are functions of the SSP service loads.

GTT message size distribution per second, $_\beta GTT_{a,b}^{h,s,y}$, expresses the impact of GTTs on STPs 22, 38. GTT message size distribution per second may be calculated directly from NETCAM pull 62.

GS message size distribution per second, $_\beta GS_{b,a}^{h,s,y}$, is used to calculate the impact of gateway screenings on STPs 22, 38. Gateway screening messages come into network 20 through POPs 28 and are used to verify that messages from IXCs are appropriate. GS message size distribution per second can be directly determined from NETCAM pull 62.

Octets per second, $\Omega_{a,b}^{h,s,y}$, and $\Omega_{b,a}^{h,s,y}$, are the number of octets per second between source a and destination b and between destination b and source a. Octets per second are derived from SSP service loads.

In an embodiment of the present invention, all sources of traffic a are SSPs 26. Destinations for traffic b may be SSPs 26, DBs 34, or POPs 28.

In addition to the set of demands shown in Equation 1, a routing matrix is required for each study year. The routing matrix indicates which STPs 22, 38 and core network links are used to connect each source a with each destination b.

Referring now to FIG. 4, service loads are estimated in block 120. Service load for STPs 22, 38 are estimated based on a first set of network traffic information and service descriptions. The first set of network traffic information is obtained from NETCAM pull 62. A description of service load calculations is provided with regard to FIG. 5 below.

Correction factors are calculated in block 122. The service load correction factors are based on a second set of network traffic information. The second set of network traffic information includes NETCAM pull 62 data that is not part of the first set of network traffic information. Some input data are redundant. For example, to and from octets per second on the LSTP-RSTP links may be calculated from loads by service and the corresponding message sets. From the same information, the total number of messages arriving at RSTP 38 may be calculated. However, the octets per second on the LSTP-RSTP links and the total messages to RSTP 38 are directly available from NETCAM pull 62. It is unlikely that data is perfectly consistent. In an embodiment of the present invention, it is assumed that the best data comes directly from NETCAM pull 62 and, therefore, demands are adjusted to agree with the NETCAM measurements. The adjustments are shown as f factors. In a preferred embodiment of the present invention, f factors are available to the user from GUI 90. Specific correction factors are described with regard to FIG. 7 below.

Correction factors are applied to service loads in block 124. Correction factors are applied to increase the accuracy of service loads.

Figure 5:
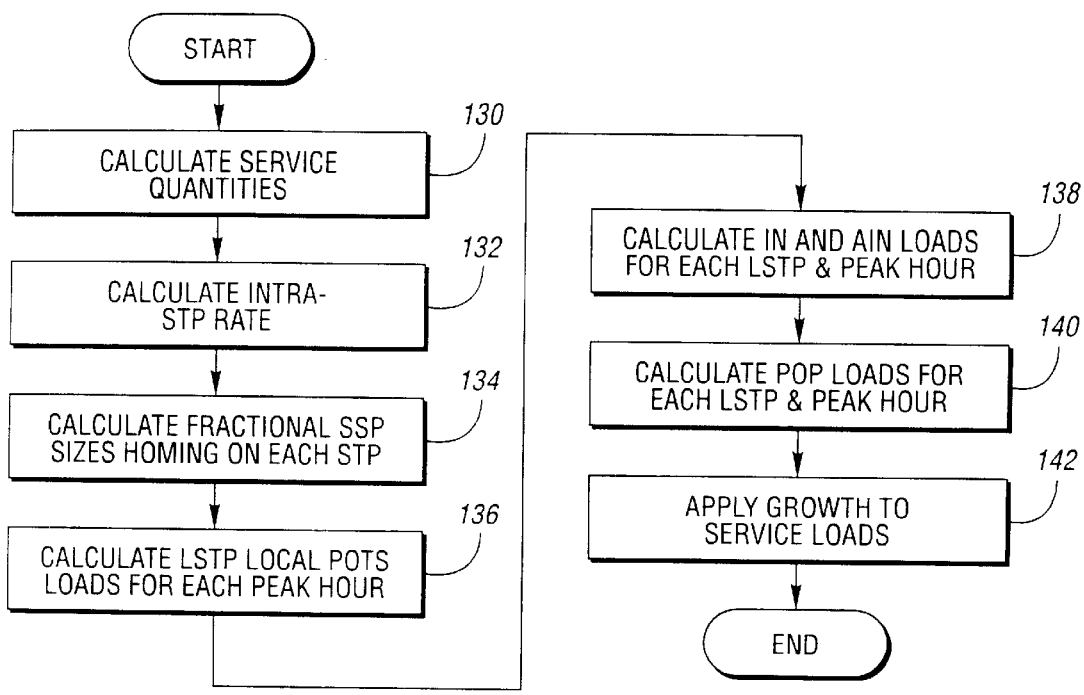
FIG. 5 is a flow diagram of an embodiment of the present invention illustrating estimating service loads.

Referring now to FIG. 5, a flow diagram of an embodiment of the present invention illustrating estimating service loads is shown. Service quantities are calculated in block 130. Estimates of average message sets $\mu_s$ are required for each service s. A message set $\mu_s$ is described in terms of two subsets, the query set and the response set as shown in Equation 2:

$$\mu_s = \{\{queries\}, \{responses\}\} \quad (2)$$

The query set and response set are made up of pairs as indicated in Equation 3:

$$\{queries\} = \{\{o_{s,1,Q}, p_{s,1,Q}\}, \{o_{s,2,Q}, p_{s,2,Q}\}, etc.\}$$
$$\{responses\} = \{\{o_{s,1,R}, p_{s,1,R}\}, \{o_{s,2,R}, p_{s,2,R}\}, etc.\} \quad (3)$$

where o is the number of octets in message m and p is the probability of message m in an average call.

A first service quantity is the number of octets per call by service s, indicated by $\omega_{s,D}$, where D is the direction, either query Q (going to DB 34) or response R (coming from DB 34). The number of octets per call is calculated in Equation 4:

$$\omega_{s,D} = \sum_{m=1,N_D} o_{s,m,D} \times p_{s,m,D} \quad (4)$$

where $N_Q$ and $N_R$ are the numbers of messages in each direction. A second service quantity is the number of octets per message, $\tau_{s,D}$. The number of octets per message is calculated using Equation 5:

$$\tau_{s,D} = \frac{\omega_{s,D}}{\sum_{m=1,N_D} p_{s,m,D}} \quad (5)$$

A third service quantity is the average number of messages per octet by service s, $\nu_s$, calculated by Equation 6:

$$\nu_s = \frac{\sum_{m=1,N_Q} p_{s,m,Q} + \sum_{m=1,N_R} p_{s,m,R}}{\sum_{m=1,N_Q} o_{s,m,Q} + \sum_{m=1,N_R} o_{s,m,R}} \quad (6)$$

The information required to calculate octets per call, octets per message, and the average number of messages per octet is provided in service descriptions.

The intraSTP rate is calculated in block 132. The rate equation used to derive intraSTP octets per second can be easily derived by considering the traffic through LSTP 22.

Figure 6:
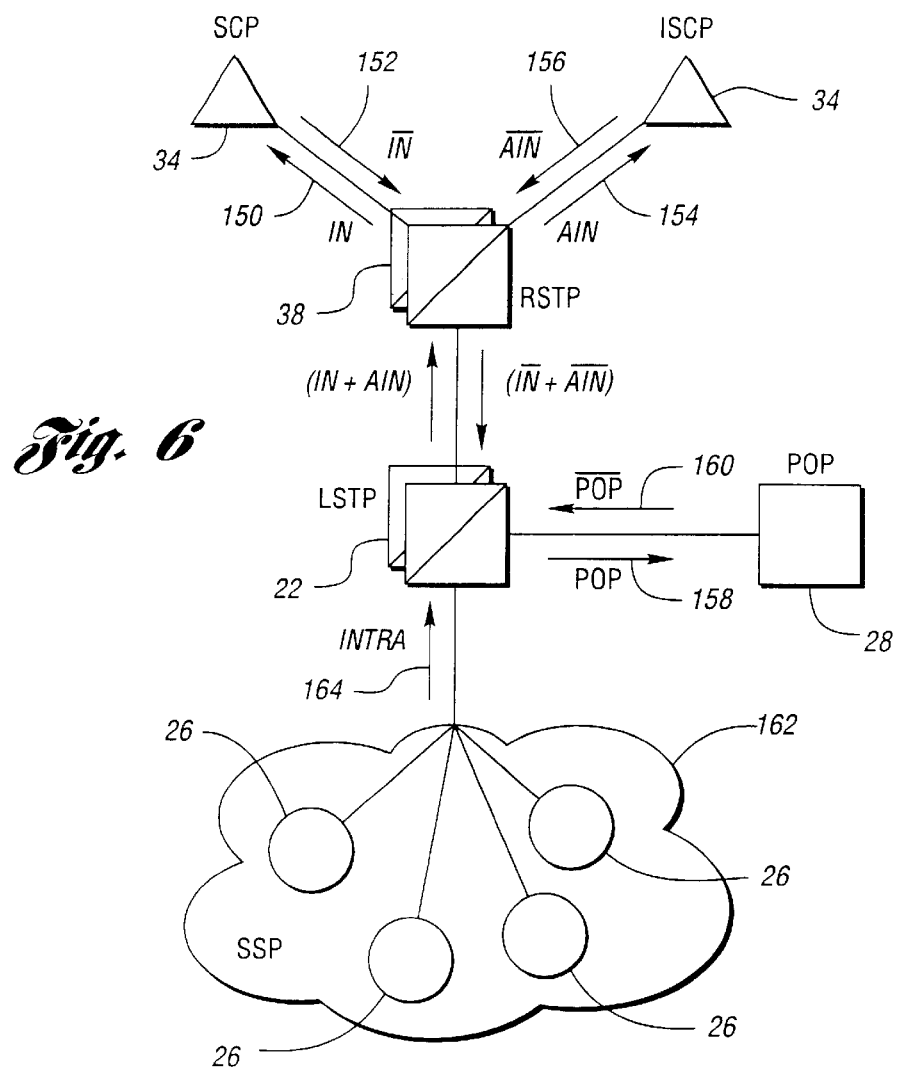
FIG. 6 is a schematic diagram of STP traffic.

Referring now to FIG. 6, a schematic diagram of STP traffic is shown. RSTP 38 provides access to DBs 34 including service control point (SCP) providing IN service and intelligent service control point (ISCP) providing AIN service. Request for IN service 150, shown by IN, is initiated by SSP 26 and reaches SCP DB 34 through RSTP 38. IN response 152, shown by $\overline{IN}$, travels from SCP DB 34 to SSP 26 through RSTP 38. Likewise, AIN query 154, shown by AIN, travels through RSTP 38 to reach ISCP DB 34 from SSP 26. AIN response 156, shown by $\overline{AIN}$, returns to SSP 26 from ISCP DB 34 through RSTP 38. The traffic between RSTP 38 and LSTP 22 to which SSP 26 is homed is then the sum of IN and AIN traffic. Traffic between SSP 26 and POP 28 must also flow through LSTP 22 onto which SSP 26 is homed. Traffic to POP 28, indicated by 158, is shown by POP. Traffic from POP 28, indicated by 160, is shown by POP. The collection of all SSPs 26 homed to LSTP 22 is indicated by 162. The total traffic flowing through LSTP 22 from every SSP 26 which is homed to LSTP 22 to any other SSP 26 is indicated by 164 and labeled INTRA. The total traffic leaving LSTP 22, STP, is expressed in Equation 7:

$$STP = INTRA + IN + AIN + POP + \overline{IN} + \overline{AIN} + \overline{POP} \quad (7)$$

Solving Equation 7 the traffic entering LSTP 22 yields Equation 8:

$$INTRA = STP - (IN + AIN) - (\overline{IN} + \overline{AIN}) - POP - \overline{POP} \quad (8)$$

Since INTRA represents the traffic within LSTP 22, Equation 8 can be rewritten to solve for intraSTP octets per second as shown in Equation 9:

$$\Omega_{L,L}^{h,sum} = \Omega_L^{h,sum} - \Omega_{L,RSTP}^{h,sum} - \Omega_{RSTP,L}^{h,sum} - \Sigma_\kappa \Omega_{L,\pi_{L,\kappa}}^{h,sum} - \Sigma_\kappa \Omega_{\pi_{L,\kappa},L}^{h,sum} \quad (9)$$

where $\Omega_{L,L}^{h,sum}$, is the intraSTP octets per second, $\Omega_L^{h,sum}$, is the total octets per second arriving at LSTP L for the sum of embedded services by hour h, $\Omega_{L,RSTP}^{h,sum}$, is the total number of octets per second arriving at LSTP L from RSTP 38 for the sum of embedded services by hour h, $\Omega_{RSTP,L}^{h,sum}$, is the total octets per second leaving LSTP L for RSTP 38 for the sum of embedded services by hour h, $\Omega_{L,\pi_{L,\kappa}}^{h,sum}$, is the octets per second on links from LSTP L to POP π for the sum of appropriate embedded services, and $\Omega_{\pi_{L,\kappa},L}^{h,sum}$, is the octets per second from POP T: to LSTP L. The κ indicates the type of POP 28. Each value in Equation 9 except for the intraSTP octets per second is available from NETCAM pull 62.

Referring again to FIG. 5, fractional SSP sizes homing on each STP are calculated in block 134. The demand $D_{a,b}^{h,s,y}$, requires loads by SSP 26 and not by STP 22. From NET-CAM pull 62, octets per second on A-links 27 from each SSP 26 to STP 22 onto which SSP 26 is homed, $\Omega_{i,L}^{h,sum}$, are obtained. Also, octets per second from STP 22 to each SSP 26, $\Omega_{L,i}^{h,sum}$, are obtained. The symbol L identifies STP 22 and i identifies SSP 26 homed to STP 22. The fraction of traffic from a particular SSP i to STP L, $\eta_{i,L}^{h,s}$, is shown in Equation 10:

$$\eta_{i,L}^{h,s} = \frac{\Omega_{i,L}^{h,sum}}{\sum_{i=1,N_L} \Omega_{i,L}^{h,sum}} \quad (10)$$

Similarly, the fraction of traffic to SSP 26 from STP 22 is shown in Equation 11:

$$\eta_{L,i}^{h,s} = \frac{\Omega_{L,i}^{h,sum}}{\sum_{i=1,N_L} \Omega_{L,i}^{h,sum}} \quad (11)$$

Note that, for each STP 22, the equalities in Equations 12 and 13 must hold.

$$\sum_{i=1,N_L} \eta_{i,L}^{h,s} = 1 \quad (12)$$

$$\sum_{i=1,N_L} \eta_{L,i}^{h,s} = 1 \quad (13)$$

LSTP local POTS loads are calculated for each peak hour in block 136. The service load for POTS calls, $\Lambda_L^{h,s}$, where s equals POTS services, is expressed in Equation 14:

$$\Lambda_L^{h,s} = \frac{\Omega_{L,L}^{h,sum}}{(\omega_{s,Q} + \omega_{s,R})} \quad (14)$$

The term $(\omega_{s,Q} + \omega_{s,R})$ represents the total octets per POTS call.

In an embodiment of the present invention, a local tandem factor is included. A certain percentage of calls goes through local tandem switches. Signaling for those calls goes through STP 22 twice. Since the SSP-to-SSP calls per second are estimated from the number of octets going through LSTP 22, it is essential to divide the estimate by the local tandem factor to achieve a corrected result. The local tandem factor, F, is shown in Equation 15:

$$F = \frac{x + 2y}{x + y} \quad (15)$$

where x is the number of calls on high usage groups and y is the number of calls going through a local tandem during a certain time period. A study of peg counts on all trunk groups under LSTP 22 showed that a good value for local tandem factor F is 1.4.

IN and AIN loads are calculated for each LSTP and peak hour in block 138. IN embedded services load, $\Lambda_L^{h,s}$, where s is IN services, in calls per second is defined in Equation 16:

$$\Lambda_L^{h,s} = \frac{GTT_{RSTP}^s \times (\Omega_{L,RSTP}^{h,sum} + \Omega_{RSTP,L}^{h,sum})}{\left(\sum_L (\Omega_{L,RSTP}^{h,sum} + \Omega_{RSTP,L}^{h,sum})\right)} \quad (16)$$

This operation scales the GTTs at RSTP by the octet load on the links from STP L to RSTP to estimate the loads at L. The AIN embedded services load, $\Lambda_L^{h,s}$, where s is AIN services, in calls per second is defined in Equation 17:

$$\Lambda_L^{h,s} = GTT_L^s \quad (17)$$

POP loads are calculated for each LSTP and peak hour in block 140. POP services load, $\Lambda_L^{h,s}$, where s is POP services, is described by Equation 18:

$$\Lambda_L^{h,s} = \frac{1}{2} \frac{(\Omega_{L,\pi_{L,k}}^{h,sum} + \Omega_{\pi_{L,k},L}^{h,sum})}{(\omega_{s,Q} + \omega_{s,R})} \quad (18)$$

The POP services load is the load from SSP 26 to POPs 28 only. Hence division by the factor of two in Equation 18.

Growth is applied to service loads in block 142. The service load for each year in the network planning study, expressed as $\Lambda_L^{h,s,y}$, is calculated by Equation 19:

$$\Lambda_L^{h,s,y} = \Lambda_L^{h,s} \times (1 + g_s)^y \quad (19)$$

where $g_s$ is the yearly growth factor for service s and y is the year index. The base year index is 0.

Figure 7:
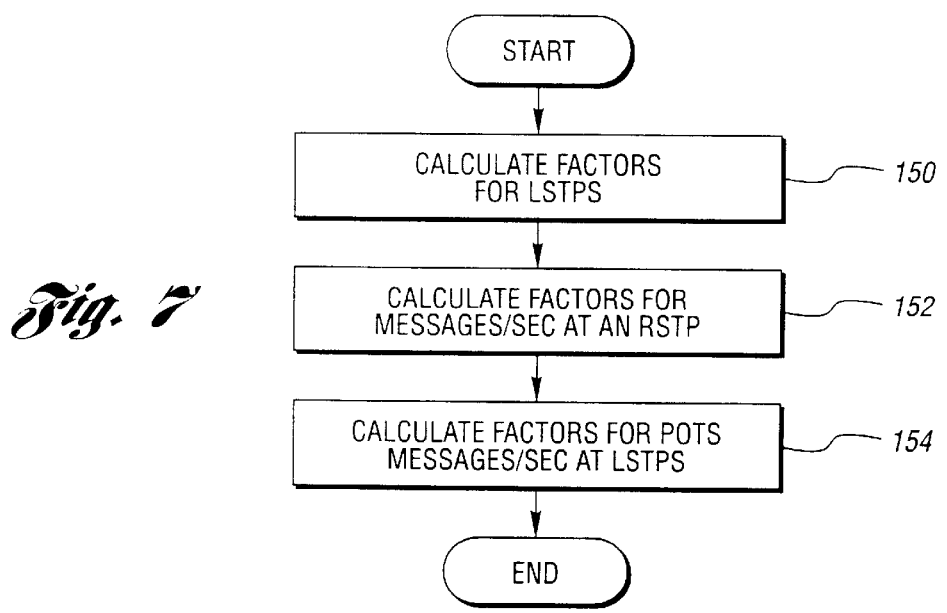
FIG. 7 is a flow diagram of an embodiment of the present invention illustrating calculating correction factors.

Referring now to FIG. 7, a flow diagram of an embodiment of the present invention illustrating calculating correction factors is shown. Correction factors are calculated using different information from NETCAM pull 62 than the information used for calculating corresponding service loads. Therefore, correction factors can be used to verify the accuracy of estimated service loads. Service loads are also multiplied by corresponding correction factor to improve the accuracy of the service loads.

Correction factors are calculated for LSTPs in block 150. For all IN and AIN services s, if $\Lambda_L^{h,s}$, and $\omega_{s,D}$, were perfectly known, then the equalities shown in Equations 20 and 21 would hold if traffic on the D-links between DB 34 and RSTP 38 consists of database traffic only.

$$\Omega_{L,RSTP}^{h,sum} = \sum_s \Lambda_L^{h,s} \times \omega_{s,Q} \tag{20}$$

$$\Omega_{RSTP,L}^{h,sum} = \sum_s \Lambda_L^{h,s} \times \omega_{s,R} \tag{21}$$

Scale factor $f_{L,Q}^h$, forces STP service loads in the demand calculation to match NETCAM pull 62 octets per second on D-links from STP L to RSTP 38. Correction factor $f_{L,Q}^h$, is defined in Equation 22:

$$\Omega_{L,RSTP}^{h,sum} = f_{L,Q}^h \times \sum_s \Lambda_L^{h,s} \times \omega_{s,Q} \tag{22}$$

Likewise, correction factor $f_{L,R}^h$, forces service loads by STP in the demand calculation to match NETCAM pull 62 octets per second on D-links from RSTP 38 to STP L. Correction factor $f_{L,R}^h$, is defined in Equation 23:

$$\Omega_{RSTP,L}^{h,sum} = f_{L,R}^h \times \sum_s \Lambda_L^{h,s} \times \omega_{s,R} \tag{23}$$

Correction factors for messages per second at an RSTP are calculated in block 152. The RSTP message factor forces the messages observed through RSTP 38 to match those calculated from estimated service loads and service descriptions. An estimate of the total number of messages per second arriving at RSTP 38 from STP L for service s and peak hour h during the base year, $_\beta \overline{M}_{L,RSTP}^{h,s,0}$, is shown in Equation 24:

$$_\beta \overline{M}_{L,RSTP}^{h,s,0} = {_\beta N_Q^s} \times \Lambda_L^{h,s} \tag{24}$$

where $_\beta N_Q^s$, is the number of query messages greater than O($\beta$) in service s. Likewise, an estimate of the total number of messages per second leaving RSTP 38 for STP L in the base year, $_\beta \overline{M}_{RSTP,L}^{h,s,0}$, is shown in Equation 25:

$$_\beta \overline{M}_{RSTP,L}^{h,s,0} = {_\beta N_R^s} \times \Lambda_L^{h,s} \tag{25}$$

where $_\beta N_R^s$, is the number of response messages greater than O($\beta$) in service s. RSTP correction factor, $f_{RSTP}^h$, is then defined by Equation 26:

$$_0 M_{RSTP}^{h,sum} = f_{RSTP}^h \sum_s \sum_L \left( _0 \overline{M}_{L,RSTP}^{h,s,0} + {_0 \overline{M}_{RSTP,L}^{h,s,0}} \right) \tag{26}$$

where $_0 M_{RSTP}^{h,sum}$, is the total number of messages per second arriving at RSTP 38 for the sum of embedded services by hour as determined from NETCAM pull 62.

Correction factors for POTS messages per second at LSTPs are calculated in block 154. The POTS local message correction factor adjusts messages through each STP 22 to agree with data from NETCAM pull 62. Just as the intraSTP octets per second in Equation 9 were derived from the message flow for INTRA in Equation 8, intraSTP messages per second are expressed in Equation 27:

$$_\beta M_{L,L}^{h,sum} = \tag{27}$$
$$_\beta M_L^{h,sum} - {_\beta M_{L,RSTP}^{h,sum}} - {_\beta M_{RSTP,L}^{h,sum}} - \sum_k {_\beta M_{L,\pi_{L,k}}^{h,sum}} - \sum_k {_\beta M_{\pi_{L,k} L}^{h,sum}}$$

The total number of message per second arriving at STP 22 for the sum of embedded services by hour, $_0 M_L^{h,sum}$, is obtained from NETCAM pull 62. The total number of messages per second from STP L to RSTP 38 is derived as in Equation 28:

$$_0 M_{L,RSTP}^{h,sum} = f_{RSTP}^h \times {_0 N_Q^s} \times \Lambda_L^{h,s} \tag{28}$$

Likewise, the total number of messages per second from RSTP 38 to STP L can be calculated as in Equation 29:

$$_0 M_{RSTP,L}^{h,sum} = f_{RSTP}^h \times {_0 N_R^s} \times \Lambda_L^{h,s} \tag{29}$$

POPS local message correction factor, $f_L^h$, is then defined by Equation 30:

$$_0 M_L^{h,sum} - \left( _0 M_{L,RSTP}^{h,sum} + {_0 M_{RSTP,L}^{h,sum}} \right) = \tag{30}$$
$$(\nu_{ISUP} \times f_L^h) \left( \Omega_{L,L}^{h,sum} + \sum_k \Omega_{L,\pi_{L,k}}^{h,sum} + \sum_k \Omega_{\pi_{L,k} L}^{h,sum} \right)$$

where $\nu_{ISUP}$ is used to convert messages per second to octets per second and is calculated from Equation 6.

Referring again to FIG. 4, applying correction factors to service loads as in block 124 can now be further explained. The service load dependent terms in Equation 1 are found using the correction factors. In particular, the message size distribution per second from source a to destination b is determined by Equation 31:

$$_\beta M_{a,b}^{h,s,y} = \eta_{i,L}^{h,s} \times \Lambda_L^{h,s,y} \times {_\beta N_Q^s} \times f_{RSTP}^h \tag{31}$$

The message size distribution per second between destination b and source a is shown in Equation 32:

$$_\beta M_{b,a}^{h,s,y} = \eta_{L,i}^{h,s} \times \Lambda_L^{h,s,y} \times {_\beta N_R^s} \times f_{RSTP}^h \tag{32}$$

The number of octets per second between source a and destination b is described in Equation 33:

$$\Omega_{a,b}^{h,s,y} = \eta_{i,L}^{h,s} \times \Lambda_L^{h,s,y} \times \omega_{s,Q} \times f_{L,Q}^h \tag{33}$$

The number of octets per second between destination b and source a is shown in Equation 34:

$$\Omega_{b,a}^{h,s,y} = \eta_{L,i}^{h,s} \times \Lambda_L^{h,s,y} \times \omega_{s,R} \times f_{L,R}^h \tag{34}$$

The POPS local message correction factor is used to correct the total messages per second from STP L to POP $\pi$ as shown in Equation 35, from POP $\pi$ to STP L as shown in Equation 36, and within STP L as shown in Equation 37:

$$_0 M_{L,\pi_{L,k}}^{h,s,y} = (\nu_{ISUP} \times f_L^h)(\Omega_{L,\pi_{L,k}}^{h,sum})(1+g_s)^y \tag{35}$$

$$_0 M_{\pi_{L,k},L}^{h,s,y} = (\nu_{ISUP} \times f_L^h)(\Omega_{\pi_{L,k},L}^{h,sum})(1+g_s)^y \tag{36}$$

$$_0 M_{L,L}^{h,s,y} = (\nu_{ISUP} \times f_L^h)(\Omega_{L,L}^{h,sum})(1+g_s)^y. \tag{37}$$

Code for the present invention was written in C, PRO-C by Oracle Corporation, and AppBuilder, an graphical development environment developed at U S West, Inc. As is appreciated by one of ordinary skill in the art, a variety of available software languages could be used to implement the present invention including VISUAL C++ or VISUAL BASIC, both by Microsoft Corporation.

While the best modes for carrying out the invention have been described in detail, those familiar with the art to which this invention relates will recognize various alternative designs and embodiments for practicing the invention as defined by the following claims.

What is claimed is:

1. A method for determining loads for a Signaling System 7 (SS7) network, the SS7 network comprising a plurality of signal transfer points (STPs) interconnected by links to form a core network, each STP having at least one element from a set comprising signal switching points (SSPs), points-of-presence (POPs), and databases (DBs), the method comprising:

automatically obtaining network traffic information from the network;

estimating service loads based on a first set of network traffic information and service descriptions;

calculating correction factors for service loads based on a second set of network traffic information; and applying correction factors to estimated service loads to determine peak loads for each STP in the core network based on network traffic, component locations, and component connectivity.

2. A method for planning an SS7 network as in claim 1 wherein estimating service loads comprises:

calculating a fractional size of each SSP homing on a given STP from the first set of network traffic information for each peak hour;

calculating local STP (LSTP) local POTS loads for each peak hour;

calculating Intelligent Network (IN) and Advanced Intelligent Network (AIN) loads for each LSTP and each peak hour;

calculating POP loads for each LSTP and for each peak hour; and applying growth to service loads for each study period.

3. A method for planning an SS7 network as in claim 2 wherein calculating correction factors comprises:

determining RSTP-LSTP correction factors for each RSTP-to-LSTP link by peak hour as the ratio of octets observed on the RSTP-to-LSTP link over a first time period to the estimated octets on the RSTP-to-LSTP link over the first time period, the estimated octets at each LSTP based on the calculated LSTP loads;

determining an RSTP message correction factor by peak hour as the ratio of messages observed at the RSTP over a second time period to the estimated messages at the RSTP over the second time period, the estimated messages at the RSTP based on calculated LSTP loads; and determining POTS message correction factors for each LSTP by peak hour as the ratio of POTS messages observed at the LSTP to the estimated POTS messages at the LSTP, POTS messages observed at each LSTP based on a number of messages observed at the LSTP less a number of messages observed between the LSTP and connecting RSTP.

4. A method for planning an SS7 network as in claim 1 wherein the first set of network traffic information includes traffic rates between each RSTP-LSTP pair, traffic rates between each POP-STP pair, and traffic rates into each STP.

5. A method for planning a Signaling System 7 (SS7) network for a sequence of study periods, the SS7 network comprising a plurality of signal transfer points (STPs) interconnected by links to form a core network, each STP having at least one element from a set comprising signal switching points (SSPs), points-of-presence (POPs), and databases (DBs), the method comprising:

obtaining network traffic information from the network;

estimating service loads based on a first set of network traffic information and service descriptions;

calculating correction factors for service loads based on a second set of network traffic information;

applying correction factors to estimated service loads to determine current peak loads for each STP in the core network;

forecasting peak loads for each STP during each study period based on the current peak loads for each STP;

determining equipment capacity exhaustion for each STP, network DB, and core network link during each study period for the network based on the forecasted peak loads; and determining costs for the network for each study period.

6. A method for planning an SS7 network as in claim 5 wherein estimating service loads comprises:

calculating a fractional size of each SSP homing on a given STP from the first set of network traffic information for each peak hour;

calculating local STP (LSTP) local POTS loads for each peak hour;

calculating Intelligent Network (IN) and Advanced Intelligent Network (AIN) loads for each LSTP and each peak hour; and calculating POP loads for each LSTP and for each peak hour.

7. A method for planning an SS7 network as in claim 6 wherein calculating correction factors comprises:

determining RSTP-LSTP correction factors for each RSTP-to-LSTP link as the ratio of octets observed on the RSTP-to-LSTP link over a first time period to the estimated octets on the RSTP-to-LSTP link over the first time period, the estimated octets at each RSTP based on the calculated RSTP loads;

determining an RSTP message correction factor by peak hour as the ratio of messages observed at the RSTP over a second time period to the estimated messages at the RSTP over the second time period, the estimated messages at the RSTP based on calculated LSTP loads; and determining POTS message correction factors for each LSTP by peak hour as the ratio of POTS messages observed at that LSTP to the estimated POTS messages at that LSTP, POTS messages observed at each LSTP based on messages observed at that LSTP less messages observed between that LSTP and connecting RSTP over a third time period.

8. A method for planning an SS7 network as in claim 7 wherein the first set of network traffic information includes traffic rates between each RSTP-LSTP pair, traffic rates between each POP-STP pair, and traffic rates into each STP.

9. A system for planning a Signaling System 7 (SS7) network for a sequence of study periods, the SS7 network comprising a plurality of signal transfer points (STPs) interconnected by links to form a core network, each STP having at least one element from a set comprising signal switching points (SSPs), points-of-presence (POPs), and network databases (DBs), the system comprising:

at least one planning database comprising information on network traffic, network component locations, and network component connectivity;

a load module in communication with each of the at least one database, the load module operable to
   a. estimate service loads based on a first set of network traffic information and on service descriptions,
   b. calculate correction factors for service loads based on a second set of network traffic information,
   c. apply correction factors to estimated service loads to determine peak loads for each STP in the core network, and
   d. store the determined peak loads in one of the at least one planning database; and a forecast module in communication with the at least one planning database, the forecast module operative to determine equipment capacity exhaustion for each STP, network DB, and core network link during each study period and to determine network costs based on determined peak loads.

10. A system for planning an SS7 network as in claim 9 wherein service loads are estimated by the load module further operable to:

calculate a fractional size of each SSP homing on a given STP from the first set of network traffic information for each peak hour;

calculate local STP (LSTP) local POTS loads for each peak hour;

calculate Intelligent Network (IN) and Advanced Intelligent Network (AIN) loads for each LSTP and each peak hour;

calculate POP loads for each LSTP and for each peak hour; and apply growth to service loads for each study period.

11. A system for planning an SS7 network as in claim 10 wherein correction factors for service loads are calculated by the load module further operable to:

determine RSTP-LSTP correction factors for each RSTP-to-LSTP link by peak hour as the ratio of octets observed on the RSTP-to-LSTP link over a first time period to the estimated octets on the RSTP-to-LSTP link over the first time period, the estimated octets at each LSTP based on the calculated LSTP loads;

determine an RSTP message correction factor by peak hour as the ratio of messages observed at the RSTP over a second time period to the estimated messages at the RSTP over the second time period, the estimated messages at the RSTP based on calculated LSTP loads; and determine POTS message correction factors for each LSTP by peak hour as the ratio of POTS messages observed at that LSTP to the estimated POTS messages at that LSTP, POTS messages observed at each LSTP based on a number of messages observed at that LSTP less a number of messages observed between that LSTP and connecting RSTP.

12. A system for planning an SS7 network as in claim 9 wherein the first set of network traffic information includes traffic rates between each RSTP-LSTP pair, traffic rates between each POP-STP pair, and traffic rates into each STP.

13. A system for planning an SS7 network as in claim 9 further comprising a user interface operable to display correction factors to a user.

* * * * *